(12) United States Patent  
Kim

(10) Patent No.: US 11,175,885 B2
(45) Date of Patent: Nov. 16, 2021

(54) DISPLAY APPARATUS, AUDIO APPARATUS AND METHOD FOR CONTROLLING THEREOF

(71) Applicant: SAMSUNG ELECTRONICS CO., LTD., Suwon-si (KR)

(72) Inventor: Jinman Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/941,914

(22) Filed: Jul. 29, 2020

(65) Prior Publication Data
US 2021/0034322 A1  Feb. 4, 2021

(30) Foreign Application Priority Data

Aug. 2, 2019 (KR) .................. 10-2019-0094373

(51) Int. Cl.
*G06F 17/00* (2019.01)
*G06F 3/16* (2006.01)
*G06F 1/16* (2006.01)
*H04R 5/02* (2006.01)
*H04R 5/04* (2006.01)

(52) U.S. Cl.
CPC ............ *G06F 3/165* (2013.01); *G06F 1/1605* (2013.01); *H04R 5/02* (2013.01); *H04R 5/04* (2013.01); *H04R 2205/021* (2013.01)

(58) Field of Classification Search
CPC ......... G06F 3/165; G06F 1/1605; H04R 5/02; H04R 5/04; H04R 2205/021
See application file for complete search history.

(56) References Cited

U.S. PATENT DOCUMENTS

| 7,734,835 B2 | 6/2010 | Jo et al. |
| 8,020,102 B2 | 9/2011 | Sokol et al. |
| 8,750,536 B2 | 6/2014 | Toba et al. |
| 9,693,109 B1 | 6/2017 | Mishra et al. |

(Continued)

FOREIGN PATENT DOCUMENTS

| JP | 2009260458 A | 11/2009 |
| KR | 10-2005-0059840 A | 6/2005 |

(Continued)

OTHER PUBLICATIONS

Communication dated Oct. 26, 2020, issued by the International Searching Authority in counterpart International Application No. PCT/KR2020/009671 (PCT/ISA/210 and 237).

*Primary Examiner* — Joseph Saunders, Jr.
(74) *Attorney, Agent, or Firm* — Sughrue Mion, PLLC

(57) ABSTRACT

A method for controlling a display apparatus includes: based on a communication connection with an audio device being established through a first interface, transmitting, to the audio device, audio setup information of the display apparatus; based on receiving a first audio signal comprising a plurality of channels from an external server, transmitting a second audio signal comprising the plurality of channels to the audio device; receiving, from the audio device, a third audio signal comprising a height channel obtained from the second audio signal based on the audio setup information of the display apparatus; and outputting the received third audio signal.

20 Claims, 10 Drawing Sheets

(56) References Cited

U.S. PATENT DOCUMENTS

| | | | |
|---|---|---|---|
| 2003/0185400 A1* | 10/2003 | Yoshizawa | H04R 5/02 |
| | | | 381/58 |
| 2006/0117115 A1 | 6/2006 | Jo et al. | |
| 2006/0117346 A1 | 6/2006 | Jo et al. | |
| 2010/0321573 A1* | 12/2010 | Bohm | H04N 21/43635 |
| | | | 348/554 |
| 2017/0228213 A1 | 8/2017 | Kim et al. | |
| 2018/0077511 A1* | 3/2018 | Mehta | H04S 7/30 |
| 2018/0262855 A1 | 9/2018 | Guldener et al. | |
| 2019/0191248 A1 | 6/2019 | Stead et al. | |

FOREIGN PATENT DOCUMENTS

| | | |
|---|---|---|
| KR | 10-2006-0059354 A | 6/2006 |
| KR | 10-2019-0048742 A | 5/2019 |

\* cited by examiner

DISPLAY APPARATUS, AUDIO APPARATUS AND METHOD FOR CONTROLLING THEREOF

CROSS-REFERENCE TO RELATED APPLICATION

This application is based on and claims priority under 35 U.S.C. § 119 to Korean Patent Application No. 10-2019-0094373, filed on Aug. 2, 2019, in the Korean Intellectual Property Office, the disclosure of which is incorporated by reference herein in its entirety.

BACKGROUND

1. Field

The disclosure relates to a display apparatus, an audio device, and a method for controlling a display apparatus and an audio device. More particularly, the disclosure relates to a method for outputting an audio signal including a height channel by a display apparatus.

2. Description of Related Art

As the thickness of a flat panel display apparatus such as a liquid crystal display (LCD) or a light emitting diode (LED) television becomes thinner, the performance of a speaker embedded in the display apparatus is limited. Therefore, in order to supplement the performance of a speaker embedded in a display apparatus having the thin thickness, research and demand for an audio/video (AV) amplifier (AMP) (or a sound bar), which is an acoustic device for outputting a stereo sound by connecting to a digital image device, is gradually increasing.

The AV AMP applies a band pass-pass filter for obtaining a center channel of an audio signal input from a source device (e.g., a Blu-ray Disc (BD)/digital video disc (DVD) player), a video signal input is synthesized with the filtered audio signal, and the synthesized signal is then transmitted to a display apparatus via high-definition multimedia interface (HDMI). The display apparatus separates the signal received from the AV AMP through the HDMI into a video/audio signal, and the separated audio signal is converted into a two channel (CH) signal and reproduced in a speaker embedded in the display apparatus.

Only a simplex communication using HDMI transition minimized differential signaling (TMDS) interface between the AV AMP and the display apparatus is performed, and there is a problem in that the display apparatus may only process the audio signal transmitted from the source device to the AV AMP. That is, since the signal received from the AV AMP through the HDMI includes a video signal and the filtered audio signal, the display apparatus may not process a different video signal once the signal is received from the AM AMP Accordingly, there is a need for an apparatus for decoding an audio signal separately in a display apparatus to process a multi-channel audio signal of a streaming service received by the display apparatus through an external server or the like.

SUMMARY

In accordance with an aspect of the disclosure, a display apparatus may include a communication module comprising a circuit; a first interface; a second interface; a memory configured to store at least one instruction; and a processor connected to the communication module, the first interface, the second interface, and the memory, and configured to control the display apparatus. The processor, by executing the at least one instruction, may be configured to: based on a communication connection with an audio device being established through the first interface, transmit, to the audio device, audio setup information of the display apparatus through the first interface; based on receiving a first audio signal comprising a plurality of channels from an external server through the communication module, transmit a second audio signal comprising the plurality of channels to the audio device through the second interface; receive, from the audio device, a third audio signal comprising a height channel obtained based on the audio setup information of the display apparatus from the second audio signal through the first interface; and output the received third audio signal.

The first interface may be Serialized/Deserialized interface, and the second interface may be high definition multimedia interface enhanced audio return channel.

A plurality of speakers may be positioned in different positions along a height dimension of the display apparatus.

The third audio signal may be obtained based on position information and output information of the plurality of speakers provided in the audio setup information.

The display apparatus may further include a display.

The processor may be further configured to, based on the communication connection with the audio device being established through the first interface, control the display to display a user interface (UI) inquiring how to output the first audio signal.

The processor may be further configured to, based on a method of outputting the first audio signal without using the audio device being selected through the UI, process and output the first audio signal based on the audio setup information of the display apparatus.

In accordance with another aspect of the disclosure, an audio device may include a first interface; a second interface; a memory configured to store at least one instruction; and a processor configured to execute the at least one instruction. The processor, by executing the at least one instruction, may be further configured to: based on a communication connection with a display apparatus being established through the first interface, receive, from the display apparatus, audio setup information of the display apparatus through the first interface; based on receiving, from the display apparatus, a first audio signal comprising a plurality of channels through the second interface, obtain a second audio signal comprising a height channel based on the audio setup information of the display apparatus; transmit, to the display apparatus, the second audio signal through the first interface, and output a third audio signal excluding the second audio signal.

The first interface may be a Serialized/Deserialized interface, and the second interface may be High Definition Multimedia Interface enhanced Audio Return Channel.

The processor may be further configured to: determine the second audio signal comprising the height component based on position information and output information of a plurality of speakers of the display apparatus provided in the audio setup information, and obtain the second audio signal by filtering the first audio signal comprising the determined height component.

The processor may be further configured to control a volume value of the second audio signal and a volume value of the third audio signal to be identical based on volume setup information of the display apparatus provided in the audio setup information.

The audio device may further include a third interface.

The processor may be further configured to based on receiving, from an external device, the first audio signal comprising a plurality of channels through the third interface, obtain the second audio signal comprising the height channel from the first audio signal based on the audio setup information of the display apparatus.

In accordance with another aspect of the disclosure, a method for controlling a display apparatus may include: based on a communication connection with an audio device being established through a first interface, transmitting, to the audio device, audio setup information of the display apparatus; based on receiving a first audio signal comprising a plurality of channels from an external server, transmitting a second audio signal comprising the plurality of channels to the audio device; receiving, from the audio device, a third audio signal comprising a height channel obtained from the second audio signal based on the audio setup information of the display apparatus; and outputting the received third audio signal.

The first interface may be a Serialized/Deserialized interface, and a second interface of the display apparatus is high definition multimedia interface enhanced audio return channel.

The third audio signal may be obtained based on position information and output information of a plurality of speakers provided in the audio setup information.

The transmitting audio setup information of the display apparatus may further include: based on the communication connection with the audio device being established through the first interface, displaying a user interface (UI) inquiring how to output the first audio signal.

The method may further include, based on a method of outputting the first audio signal without using the audio device being selected through the UI, processing and outputting the first audio signal based on the audio setup information of the display apparatus.

In accordance with another aspect of the disclosure, a method for controlling an audio device may include: based on a communication connection with a display apparatus being established through a first interface, receiving, from the display apparatus, audio setup information of the display apparatus; based on receiving a first audio signal comprising a plurality of channels from the display apparatus, obtaining a second audio signal comprising a height channel based on the audio setup information of the display apparatus; transmitting the second audio signal to the display apparatus; and outputting a third audio signal excluding the second audio signal.

The first interface may be a Serialized/Deserialized interface, a second interface of the audio device is high definition multimedia interface enhanced audio return channel.

The obtaining the second audio signal may include determining the second audio signal comprising the height component based on position information and output information of a plurality of speakers of the display apparatus provided in the audio setup information; and obtaining the second audio signal by filtering the first audio signal comprising the determined height component.

The obtaining the second audio signal may include controlling a volume value of the second audio signal and a volume value of the third audio signal to be identical based on volume setup information of the display apparatus provided in the audio setup information.

The method may further include, based on receiving, from an external device, the first audio signal through a third interface, obtain the second audio signal from the first audio signal based on audio setup information of the display apparatus.

BRIEF DESCRIPTION OF THE DRAWINGS

The above and/or other aspects, features, and advantages of certain embodiments of the present disclosure will be more apparent from the following detailed description, taken in conjunction with the accompanying drawings, in which.

DETAILED DESCRIPTION

Figure 1:
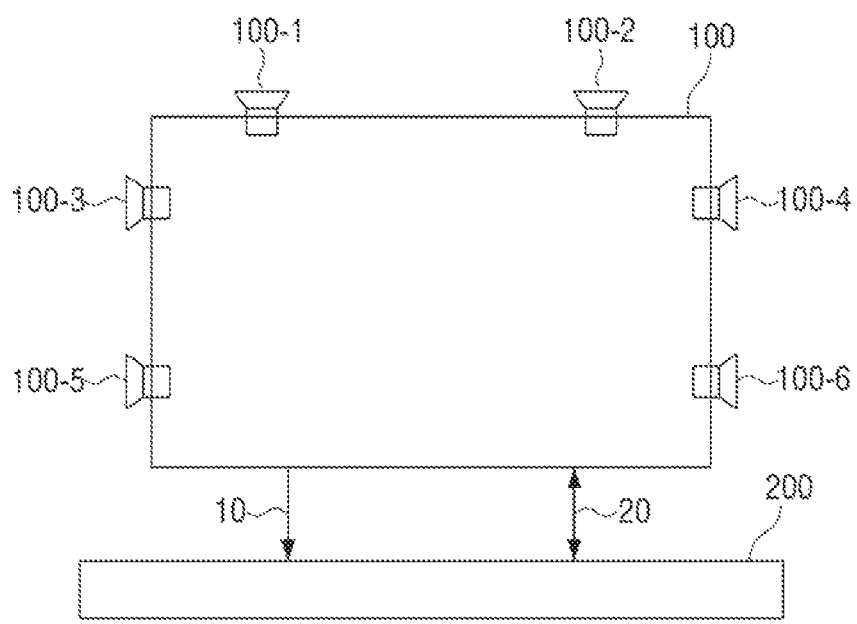
FIG. 1 is a schematic diagram of a controlling method of a display apparatus and a controlling method of an audio device according to an embodiment.

The embodiments may apply various transformations and may have various embodiments, which are illustrated in the drawings and are described in detail in the detailed description. However, this disclosure is not intended to limit the embodiments described herein but includes various modifications, equivalents, and/or alternatives. In the context of the description of the drawings, like reference numerals may be used for similar components.

The following examples may be modified in various different forms, and the scope of the disclosure is not limited to the following examples. Rather, these embodiments are provided so that this disclosure will be thorough and complete, and will fully convey the scope of the disclosure to those skilled in the art.

The terminology used in this disclosure is used merely to describe a particular embodiment, and is not intended to limit the scope of the claims. The singular forms "a," "an," and "the" include plural expressions unless the context clearly dictates otherwise.

In this disclosure, the expressions "have," "may have," "including," or "may include" may be used to denote the presence of a feature (e.g., a numerical value, a function, an operation), and does not exclude the presence of additional features.

In this disclosure, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

The terms such as "first," "second," and so on may be used to describe a variety of elements, but the elements may not be limited by these terms. The terms are labels used only for the purpose of distinguishing one element from another.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of." The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

In an embodiment, the "module" or "part" performs at least one function or operation, and may be implemented in hardware or software or in a combination of hardware and software. In addition, a plurality of "modules" or a plurality of "parts" may be integrated into at least one module except for a "module" or "part" that needs to be implemented in a specific hardware, and may be implemented as at least one processor (not shown).

The disclosure has been provided in view of the above-described needs. Embodiments of the disclosure relate to a method for receiving, by a display apparatus, an audio signal including a height channel from the audio device and outputting the audio signal. The audio signal including the height channel may be obtained based on audio setup information of the display apparatus.

Hereinafter, the disclosure will be described in detail with reference to the accompanying drawings.

FIG. 1 is a diagram showing a method of controlling a display apparatus and an audio device according to an embodiment. As shown in FIG. 1, a display apparatus 100 may be located at a physically high altitude relative to an audio device 200. Accordingly, when an audio signal including a plurality of channels is input to the display apparatus 100 or the audio device 200, the display apparatus 100 positioned at a high altitude may output an audio signal including a height channel, and the audio device 200 may output an audio signal excluding the height channel so as to represent an immersive (three-dimensional) effect of the audio signal.

The height channel may refer to a channel enabling a height expression by outputting a height component in a three-dimensional sound field technique, such as an Dolby™ Atmos, DTS™:X, and Auro™-3D. The height channel may be made by recording at a physical height location, or computing a location of an object including spatial information, and the height channel may be implemented as an output sound of a speaker in a ceiling or a reflection sound of the speaker output toward the ceiling.

In an embodiment, when communicatively connected to the audio device 200 via a first interface 130, the display apparatus 100 may transmit the audio setup information of the display apparatus 100 to the audio device 200. The audio device 200 may also transmit the audio setup information of the audio device 200 to the display apparatus 100.

In an embodiment, the first interface 130, 230 may be a Serialized/Deserialized (Serdes) interface. The Serdes interface refers to an interface related to the transmission and reception of signals transferred between high speed serial links, and may convert parallel signals into serial signals or convert serial signals into parallel signals. The display apparatus 100 and the audio device 200 may perform duplex communication through the Serdes interface. In one embodiment, the display apparatus 100 and the audio device 200 may be capable of transmitting and receiving respective audio setup information via the Serdes interface.

In an embodiment, the audio setup information of the display apparatus 100 may include information related to the configuration of the speaker 170 of the display apparatus 100 (e.g., the number of speakers, position, etc.), information related to the output of the speaker 170 (e.g., output band of the speaker, maximum output numerical information of the speaker, etc.), and volume setup information. In an embodiment, the display apparatus 100 shown in FIG. 1 may transmit the position, number, output band, maximum output value information, and current volume setup information of the plurality of speakers 100-1, 100-2, ... , 100-6 of the display apparatus 100 through the first interface 130 to the audio device 200. The audio setup information of the audio device 200 may include, for example, an audio signal history that may be supported by the audio device 200 (for example, a Dolby™ format, a DTS™ format), a history of audio signal reception, configuration of a speaker, volume setup information, and the like.

Based on receiving an audio signal including a plurality of channels from an external server, the display apparatus 100 may transmit an audio signal including a plurality of channels to the audio device 200. The display apparatus 100 may convert an audio signal including a plurality of channels into an audio format supportable by the audio device 200 and then transmit the audio signal to the audio device 200.

If an audio signal including a plurality of channels is received, the audio device 200 may obtain an audio signal including the height channel based on audio setup information.

The audio device 200 may determine an audio signal including a height component based on audio setup information including location information and output information of a plurality of speakers 170 embedded inside or attached outside the display apparatus 100, and filter the determined audio signal to obtain an audio signal that includes the height channel. In an embodiment, as shown in FIG. 1, the audio device 200 may identify a position and an output band of the plurality of speakers 100-1, 100-2, and 100-6 embedded in the display apparatus 100, and determine an audio signal including a height component to be output from each identified speaker. The audio device 200 may filter only the determined audio signal to obtain an audio signal that includes a height channel. Since each of the plurality of speakers 100-1, 100-2, and 100-6 embedded in the display apparatus 100 is located at a different altitude, the audio device 200 may obtain an audio signal to be transmitted to the display apparatus 100 so that an audio signal including a channel having the largest height component is output from the speakers 100-1 and 100-2 located at the highest altitude. The audio device 200 may obtain an audio signal that includes the height channel such that a height component is output from a speaker of the display apparatus 100 located at a higher altitude, and transmit an audio signal including the obtained height channel to the display apparatus 100.

The audio device 200 may control the volume value of the audio signal including the height channel and the audio signal excluding the audio signal including the height channel to be identical based on the audio setup information including the volume setup information of the display apparatus 100. The audio device 200 may control the audio signal including the height channel output from each of the display apparatus 100 and the audio device 200 to have the same volume as the audio signal excluding the height channel. This is merely exemplary, and the audio device 200 may output an audio signal not including the height channel as a volume value within a threshold range of a volume value of the display apparatus 100.

In an embodiment, the audio device 200 may receive audio setup information of the display apparatus 100 including a volume value (e.g., a volume value 10) of the display apparatus 100 from the display apparatus 100. When the audio device 200 obtains an audio signal including the height channel, the audio device 200 may control the volume setting value of the audio device 200 to be a set value and transmit the audio signal including the obtained height channel to the display apparatus 100. The display apparatus 100 and the audio device 200 may output an audio signal including the height channel and an audio signal other than the audio signal that includes the height channel, respectively, in the same volume. When the volume value of the display apparatus 100 is changed, the display apparatus 100 may transmit information on the changed volume value to the audio device 200, and the audio device 200 may change the volume value of the audio device 200 to the received volume value and may control the volume value of the audio signal including the height channel and the audio signal excluding the height channel in the same manner.

The audio device 200 may receive an audio signal including a plurality of channels via a third interface 250 from an external device (e.g., a digital video disc (DVD) player, a Blue-ray player, or the like). The audio device 200 may receive an audio signal including a plurality of channels input to the display apparatus 100 from the display apparatus 100 through the first interface 220, but may receive an audio signal including a plurality of channels directly from an external device through the third interface 250. In an embodiment, the third interface may be a high definition multimedia interface (HDMI) transition minimized differential signaling (TMDS) interface.

In addition to receiving an audio signal including a plurality of channels from the display apparatus 100, the audio device 200 may obtain an audio signal including the height channel based on the audio setup information of the display apparatus 100 that includes the plurality of channels received from the external device through the third interface 250, and transmit the audio signal including the obtained height channel to the display apparatus 100.

When communicatively connected to the audio device 200 through the first interface 130, the display apparatus 100 may display a user experience interface (UI) that inquires about a method of outputting an audio signal including a plurality of channels. When a method of not using the audio device 200 when outputting an audio signal on the UI is selected, the display apparatus 100 may transmit an audio signal including a plurality of channels to the audio device 200, and process and output an audio signal including a plurality of channels based on the audio setup information of the display apparatus 100. Based on the position information and the output information of the speaker 170 of the display apparatus 100, the processor 150 may remove noise, amplify, decode, or the like, the audio signal including the plurality of channels, and the processed audio signal may be output.

When outputting the audio signal on the UI, if a method for using the audio device 200 is selected, the display apparatus 100 may transmit the audio signal including a plurality of channels to the audio device 200, and may receive the audio signal including the height channel from the audio device 200 and output the signal.

In an embodiment, the audio signal including the height channel may be received by the display apparatus 100 from the audio device 200 through the first interface capable of performing duplex communication, and the display apparatus 100 may output an audio signal including the height channel regardless of the displayed screen. The display apparatus 100 may display a preset standby screen and output the audio signal including the height channel.

In another embodiment, when an audio signal including the height channel is not included in the audio signal including a plurality of channels received by the display apparatus 100 or the audio device 200 from each of the external server and the external device, the audio device 200 may obtain an audio signal including a virtual height channel among audio signals including a plurality of channels. The audio device 200 may transmit an audio signal including the obtained virtual height channel to the display apparatus 100, and may output an audio signal other than the audio signal including the virtual height channel. The display apparatus 100 may output an audio signal that includes a transmitted virtual height channel.

Figure 2A:
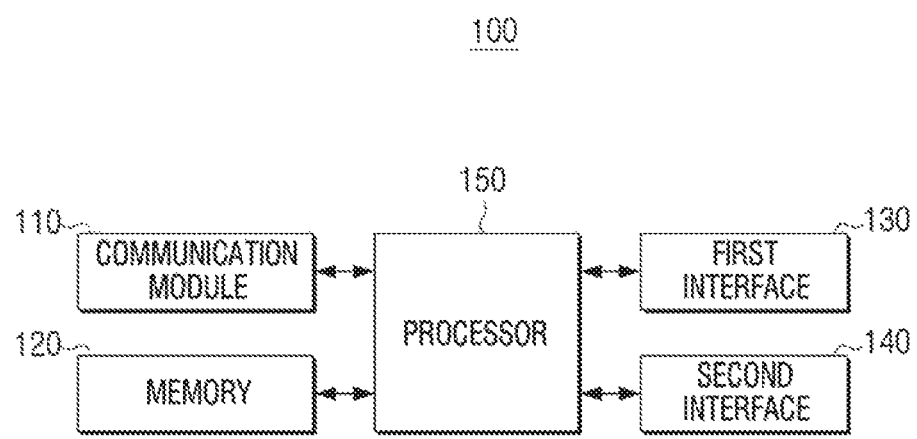
FIG. 2A is a block diagram of a display apparatus according to an embodiment.

FIG. 2A is schematic diagram showing a configuration of the display apparatus 100 according to an embodiment. As shown in FIG. 2A, the display apparatus 100 may include a communication module 110, a memory 120, a first interface 130, a second interface 140, and a processor 150. The configuration shown in FIG. 2A is provided for exemplary purposes, and appropriate hardware/software configurations that would be obvious to a person skilled in the art may be further included in the electronic apparatus 100.

The communication module 110 may be a communication interface that includes a circuitry. The communication module 110 may communicate with an external server or an external device through various communication methods. Communicatively connecting the communication module 110 with the external device may include communication via a third device (e.g., a relay, a hub, an access point, a server, a gateway, or the like).

The communication module 110 may include various communication modules to communicate with the external device or external server. For example, the communication module 110 may include a wireless communication module, for example, a cellular communication module using at least one of long term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), or the like. As another example, the wireless communication module may include, for example, wireless fidelity (WiFi), Bluetooth, Bluetooth low energy (BLE), ZigBee, radio frequency (RF), body area network (BAN), or the like.

The memory 120 may store instructions or data related to at least one other elements of the display apparatus 100. The memory 120 may be implemented as a non-volatile memory, a volatile memory, a flash-memory, a hard disk drive (HDD), slid state drive (SSD), or the like. The memory 120 may be accessed by the processor 150, and may perform reading, recording, modifying, deleting, updating, or the like, of data by the processor 150. The term memory may the read only memory (ROM), random access memory (RAM) in the processor 150, or a memory card (for example, micro secure digital (SD) card, a memory stick) mounted in the display apparatus 100. In the memory 120, program, data, or the like, for configuring various screens to be displayed in a display area of the display 160 may be stored.

The first interface 130 may communicate with the audio device 200 and may transmit audio setup information of the display apparatus 100 to the audio device 200. The first interface 130 may receive the audio signal including the height channel from the audio device 200 and the audio setup information of the audio device 200. In an embodiment, the first interface 130 may be the Serdes interface capable of converting a parallel signal into a serial signal or converting the serial signal into a parallel signal.

The second interface 140 may be, for example, a high definition multimedia interface enhanced audio return channel (HDMI eARC). The second interface 140 may transmit an audio signal including a plurality of channels to the audio device 200 or an audio signal converted to an audio format supportable by the audio device 200. The second interface 140 may transmit a signal for controlling the power and volume of the audio device 200 to the audio device 200.

The processor 150 may be connected to the communication module 110, the memory 120, the first interface 130, and the second interface 140 to control the overall operation and function of the display apparatus 100. By executing at least one instruction stored in the memory 120, the processor 150 may, when communicatively connected to the audio device 200 through the first interface 130, transmit audio setup information of the display apparatus 100 to the audio device 200 through the first interface. The processor 150 may also, based on receiving an audio signal including a plurality of channels from an external server, transmit an audio signal including the plurality of channels to the audio device 200 through the second interface 140, receive an audio signal including the height channel obtained based on the audio setup information of the display apparatus 100 provided in the audio signal including a plurality of channels from the audio device 200 through the first interface 130, and output the received audio signal including the height channel.

If the display apparatus 100 is communicatively connected to the audio device 200 through the first interface 130, the processor 150 may transmit audio setup information including information related to the configuration of the speaker 170 of the display apparatus 100 (e.g., the number of speakers, information about the location), output information (e.g., the speaker's output band, the speaker's maximum output value) and the volume setup information to the audio device 200 through the first interface 130. When the volume value of the display apparatus 100 is changed after being communicatively connected to the audio device 200 through the first interface 130, the processor 150 may transmit information about the changed volume value to the audio device 200 via the first interface 130 in real time. The processor 150 may receive audio setup information including information about an audio format supportable by the audio device 200 (e.g., Dolby™ format, DTS™ format), volume setup information, an audio signal reception history, a speaker configuration, or the like, from the audio device 200 via the first interface 130.

The processor 150 may receive an audio signal including a plurality of channels from an external server through the communication module 110. The audio signal received by the processor 150 from the external server through the communication module 110 may be an audio signal including a plurality of channels including a digital broadcast signal, a streaming audio signal of various applications, and the like.

The processor 150 may transmit an audio signal including a plurality of channels received from an external server to the audio device 200 via the second interface 140. In one embodiment, the processor 150 may transmit the audio signal received from the external server to the audio device 200 through the second interface 140 or after converting the audio signal into an acoustic format supported by the audio device 200.

The processor 150 may receive an audio signal that includes the height channel obtained based on the audio setup information of the display apparatus 100 via the first interface 130. The processor 150 may receive from the audio device 200 an audio signal including the height channel obtained based on the position and output information, volume setup information of the speaker 170 of the display apparatus 100 obtained by the audio device 200, through the first interface 130.

The processor 150 may output an audio signal including the height channel received from the audio device 200 through the speaker 170. The processor 150 may control to output the audio signal including the channel of which the height component is greatest through a speaker of the display apparatus 100 with the highest altitude.

Since the processor 150 may receive an audio signal including the height channel through the first interface 130 capable of duplex communication from the audio device 200, the processor 150 may output an audio signal not related to the screen displayed on the display 160. That is, the processor 150 may output an audio signal including the height channel while controlling the display 160 to display a predetermined standby screen.

When communicatively connected to the audio device 200 through the first interface 130, the processor 150 may control the display 160 to display a UI that inquires how to output an audio signal that includes a plurality of channels. The processor 150 may control the display 160 to display a UI asking whether to output an audio signal using the audio device 200 or to output an audio signal to the display apparatus 100 itself. If a method of not using the audio device 200 when outputting the audio signal through the input module 180 or the like is used on the UI, the processor 150 may perform various processing operations such as decoding, amplification, noise filtering, and down-mix based on the audio setup information of the display apparatus 100 on the audio signal including the plurality of channels. When a method of using an audio device on the UI is selected, the processor 150 may transmit an audio signal including a plurality of channels to the audio device 200 through the second interface 140 and output an audio signal that includes the height channel received from the audio device 200.

Figure 2B:
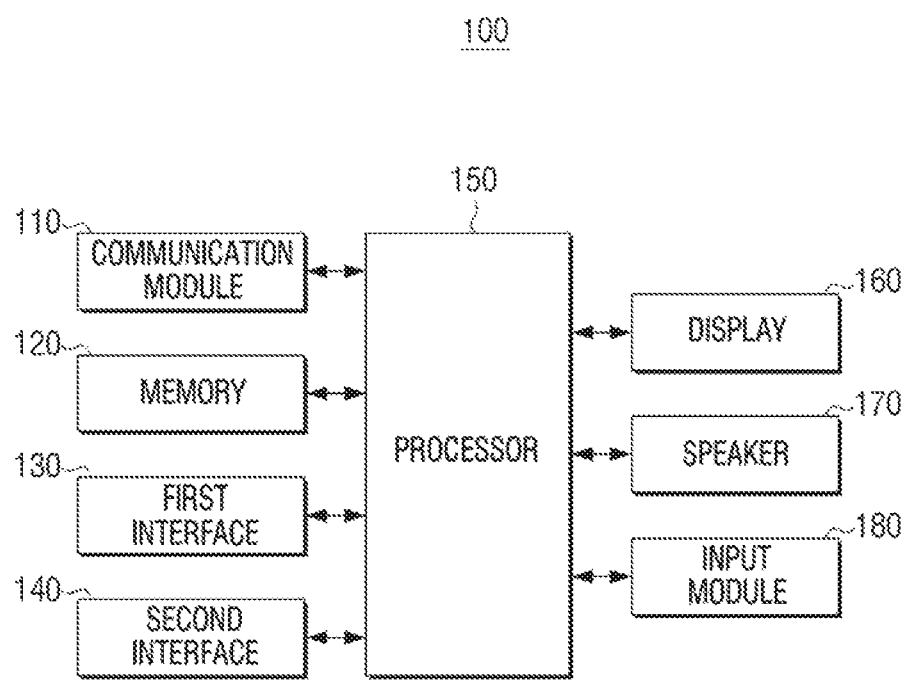
FIG. 2B is a block diagram a display apparatus according to an embodiment.

FIG. 2B is a block diagram showing the display apparatus 100, according to one embodiment. As illustrated in FIG. 2B, the display apparatus 100 may include the communication module 110, the memory 120, the first interface 130, the second interface 140, the processor 150, a display 160, a speaker 170, and an input module 180. Since the communication module 110, the memory 120, the first interface 130, the second interface 140, and the processor 150 shown in FIG. 2B have been described with reference to FIG. 2A, a detailed description thereof will be omitted.

The display 160 may display various information under the control of the processor 150. The display 160 may display a UI inquiring a method for outputting an audio signal that includes a plurality of channels. The display 160 may be implemented as a touch screen with a touch panel, but is not limited to the implementations described above and may be implemented differently depending on the type of the display apparatus 100.

The speaker 170 may be configured to output various alarm sounds or voice messages as well as various audio data for which various processing operations such as decoding, amplification, noise filtering, or the like, are performed by an audio processor. In an embodiment, the speaker 170 may output an audio signal including the height channel. The speaker 170 is only provided as an embodiment, and may be implemented as another output terminal capable of outputting audio data.

The speaker 170, which may be embedded in the display apparatus 100 or present in the outside of the display apparatus 100, may be positioned in different altitudes. The speaker 170 located at a highest altitude may output an audio signal including a channel in which the height component is greatest.

The input module 180 may receive various user inputs and deliver the user inputs to the processor 150. The input module 180 may include a touch sensor, a (digital) pen sensor, a pressure sensor, a key, or a microphone. The touch sensor may use, for example, at least one of electrostatic, resistive, infrared, or ultrasonic methods. A (digital) pen sensor may, for example, be part of a touch panel or include a separate recognition sheet. The key may include, for example, a physical button, an optical key, or a keypad.

In an embodiment, the input module 180 may obtain an input signal according to the user command input through the UI asking how to output an audio signal including a plurality of channels. The input module 180 may transmit the input signal to the processor 150.

The processor 150 may include one or more of a central processing unit (CPU), a micro controller unit (MCU), a micro processing unit (MPU), a controller, an application processor (AP), a communication processor (CP), and an Advanced Reduced instruction set computing (RISC) Machine (ARM) processor or may be defined as a corresponding term. The processor 150 may be implemented in a system on chip (SoC) type or a large scale integration (LSI) type which a processing algorithm is implemented therein or in a field programmable gate array (FPGA). The processor 150 may perform various functions by executing computer executable instructions stored in the memory 120.

Figure 3:
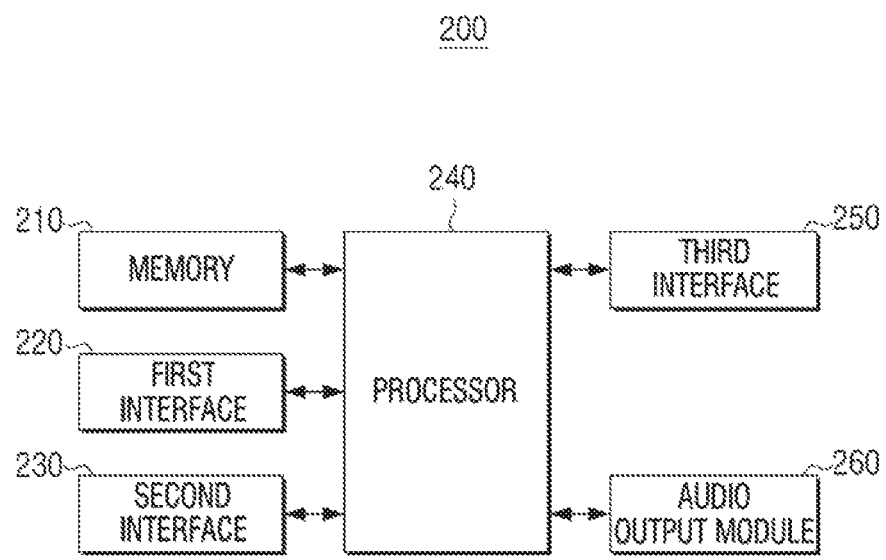
FIG. 3 is a block diagram of an audio device according to an embodiment.

FIG. 3 shows a configuration of an audio device 200, according to one embodiment. As shown in FIG. 3, the audio device 200 may include a memory 210, a first interface 220, a second interface 230, a third interface 250, and an audio output module 260. The configurations shown in FIG. 3 are exemplary for implementing embodiments of the disclosure, and appropriate hardware/software configurations that would be obvious to a person skilled in the art may be further included in the audio device 200.

The memory 210 may include at least one instruction related to the audio device 200. The memory 210 may include a semiconductor memory such as a flash memory, a magnetic storage medium such as a hard disk, and the like. In addition, various information, such as various data inputted or set or generated during execution of a program or an application can be stored in the memory 210. The memory 210 may include various software modules for operating the audio device 200 according to various embodiments, and the processor 240 may execute various software modules stored in the memory 210 to perform the operation of the audio device 200 according to various embodiments.

The first interface 220 may perform a communication connection with the display apparatus 100 and receive audio setup information of the display apparatus 100. The first interface 220 may transmit an audio signal including a height channel to the display apparatus 100. The first interface 130 of the display apparatus 100 may receive an audio signal that includes a height channel from the audio device 200. In an embodiment, the first interface 220 may be the Serdes interface in the same manner as the first interface 130 of the display apparatus 100.

The second interface 230 of the audio device 200 may receive an audio signal including a plurality of channels from the display apparatus 100. In an embodiment, the second interface 230 may be the high definition multimedia interface enhanced audio return channel (HDMI eARC) in the same manner as the second interface 140 of the display apparatus 100.

The processor 240 may be connected to the memory 210, the first interface 220, the second interface 230, the third interface 250, and the audio output module 260 to perform the overall operations and functions of the audio device 200. For example, the processor 240 may be implemented as at least one of an application specific integrated circuit (ASIC), an embedded processor, a microprocessor, hardware control logic, a hardware finite state machine (FSM), a digital signal processor (DSP), or the like.

When the display apparatus 100 and the first interface 220 of the audio device 200 are connected to each other, the processor 240 may receive the audio setup information of the display apparatus 100 through the first interface 220. The processor 240 may transmit audio setup information supported by the audio device 200 including audio format information, volume information, audio signal reception history, speaker configuration, or the like, to the audio device 200 through the first interface 220.

When an audio signal including a plurality of channels is received through the second interface 230, the processor 240 may obtain an audio signal including a height channel based on the audio setup information of the display apparatus 100. The processor 240 may determine an audio signal that includes a height component of the audio signal including the plurality of channels based on the audio setup information of the display apparatus 100 which includes the position information and the output information of the speaker of the display apparatus 100. The processor 240 may then filter the determined audio signal to obtain an audio signal that includes a height channel. For example, if a plurality of speakers of the display apparatus 100 are located at different altitudes, the processor 240 may obtain an audio signal to be transmitted to the display apparatus 100 such that an audio signal including a channel in which the height component is largest is output to the speaker located at the highest altitude.

The processor 240 may control the volume value of the audio signal including the height channel based on the audio setup information and the volume value of the audio signal excluding the height channel based on the audio setup information which includes the volume setup information of the display apparatus 100. When the audio setup information that the volume setting value of the display apparatus 100 is a value of 10 is received, the processor 240 may output the audio signal not including the height channel as the volume value 10 to output the audio signal equal to the volume value of the display apparatus 100. However, this is merely an embodiment and the processor 240 may output the audio signal with a volume value within a threshold range of the volume value of the display apparatus 100.

When an audio signal including a plurality of channels is received from an external device through the third interface 250 of the audio device 200, the processor 240 may obtain an audio signal including a height channel from an audio signal including a plurality of channels based on the audio setup information of the display apparatus 100. The processor 240 may perform the same function as the function when the audio signal is received from the display apparatus 100 in the case when the audio signal is received from the external device through the third interface 250.

When an audio signal including a plurality of channels that does not include the height channel is received via the third interface 250 or the second interface 230, the processor 240 may generate an audio signal that includes a virtual height channel among the audio signals including the plurality of channels. The processor 240 may transmit an audio signal including the generated virtual height channel to the display apparatus 100 through the first interface 220. The display apparatus 100 may output an audio signal that includes a transmitted virtual height channel.

In an embodiment, the third interface 250 may receive an audio signal including a plurality of channels from an external device (for example, a DVD player, a Blu-ray player, or the like). The third interface may be HDMI TMDS interface.

The audio output module 260 is configured to output various audio signals for which various processing methods such as decoding, amplification, noise filtering, and downmix, or the like, may be performed by an audio processor. For example, the audio output unit 260 may output an audio signal other than the height channel. In an embodiment, the audio output module 260 may output an audio signal excluding the height channel. The configuration for outputting an audio signal may be implemented as a speaker, but this is only one embodiment, and may be implemented as an output terminal capable of outputting audio data.

Figure 4:
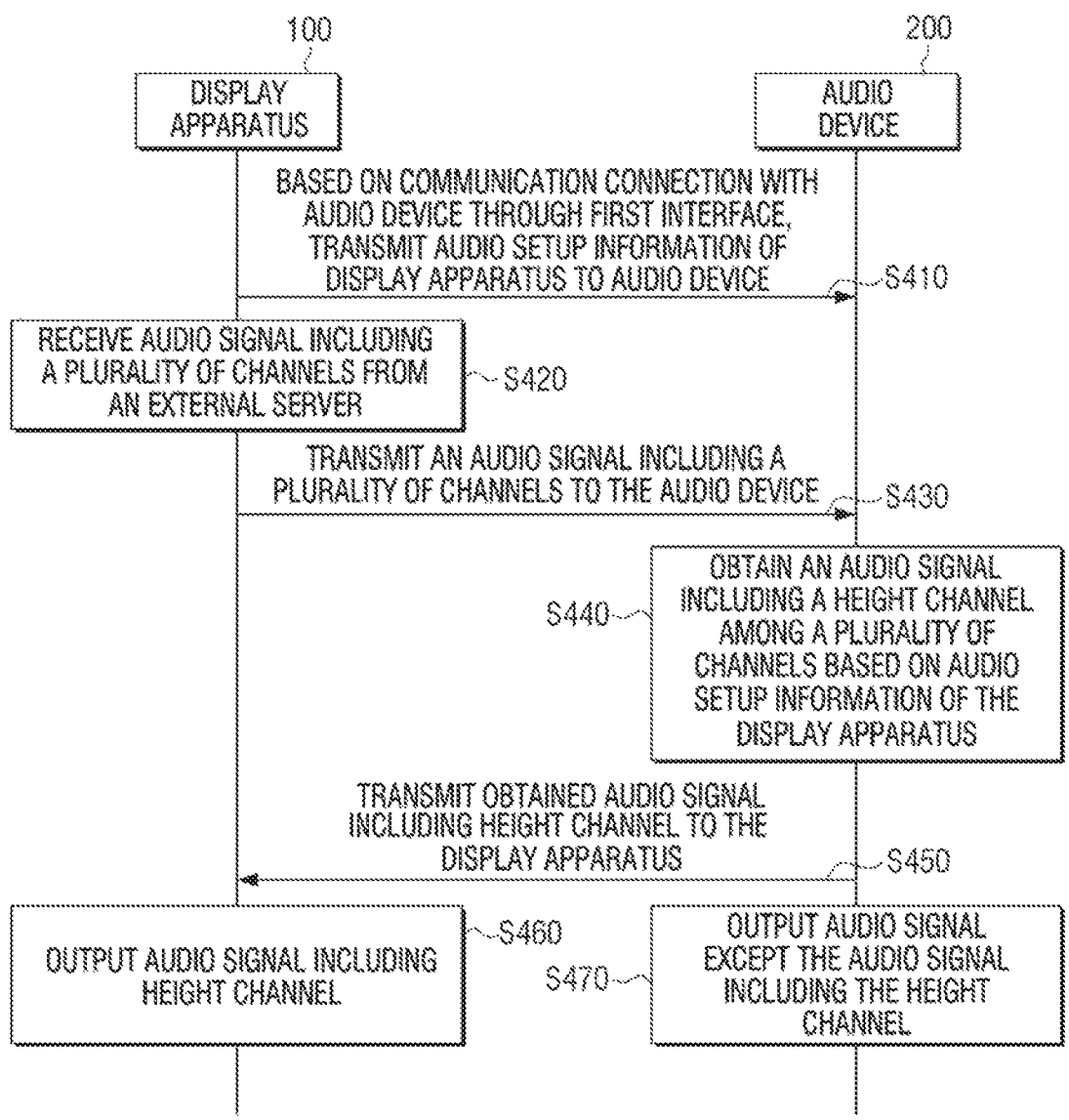
FIG. 4 is a sequence diagram showing an operation of a display apparatus and an audio device according to an embodiment.

FIG. 4 is a sequence diagram showing the operation of the display apparatus 100 and the audio device 200, according to an embodiment. First, when communicating with the audio device through the first interface 130, the display apparatus 100 may transmit the audio setup information of the display apparatus 100 to the audio device 200 in operation S410. The display apparatus 100 may transmit audio setup information including information (position, number, output band, maximum output value, etc.) related to the configuration and output of the speaker(s) of the display apparatus 100 and volume setup information to the audio device 200. The audio device 200 may also transmit the audio setup information of the audio device 200 including the reception history of the audio device 200, the configuration of the speaker, and the volume setup information to the display apparatus 100.

The display apparatus 100 may receive an audio signal including a plurality of channels from an external server in operation S420. The display apparatus 100 may receive an audio signal including a plurality of channels, such as a digital broadcast signal, a streaming audio signal of an application, or the like, from an external server.

The display apparatus 100 may transmit an audio signal including a plurality of channels to the audio device 200 in operation S430. The display apparatus 100 may transmit an audio signal including a plurality of channels to the audio device 200 as it is, or may convert the audio signal to an audio format supportable by the audio device 200 and then transmit the signal.

In operation S440, the audio device 200 may obtain an audio signal including the height channel among the plurality of channels based on the audio setup information. The audio device 200 may obtain an audio signal that includes a height channel to be output at each of a plurality of speakers located at different altitudes of the display apparatus 100. For example, the audio device 200 may determine an audio signal that includes a channel having the largest height component as an audio signal to be output to a speaker located at the highest altitude of the display apparatus 100, and filter the determined audio signal to obtain the audio signal.

The audio device 200 may transmit an audio signal including the obtained height channel to the display apparatus 100 in operation S450. The display apparatus 100 may output an audio signal including a height channel in operation S460, and the audio device 200 may output an audio signal other than an audio signal including a height channel in operation S470. When audio setup information including volume setup information of the display apparatus 100 is received from the display apparatus 100, the audio device 200 may output an audio signal other than the audio signal including the height channel at the same volume value as the volume value of the display apparatus 100. However, in other embodiments, the audio device 200 may output an audio signal having a volume value within a threshold range of a volume value of the display apparatus 100.

Figure 5:
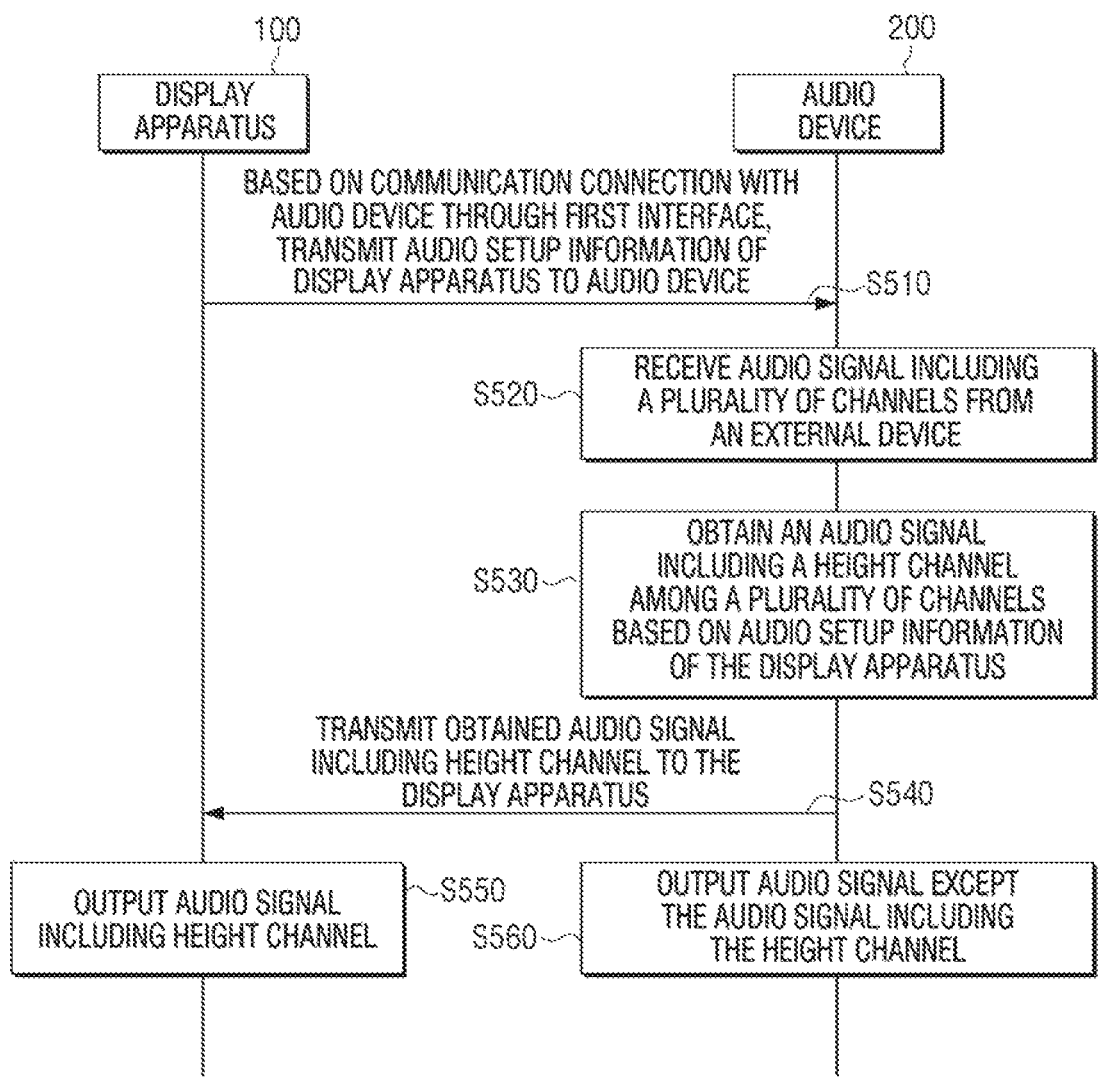
FIG. 5 is a sequence diagram showing an operation of a display apparatus and an audio device according to an embodiment.

FIG. 5 is a sequence diagram showing the operation of the display apparatus 100 and the audio device 200, according to an embodiment. FIG. 4 is a sequence diagram showing a case where the display apparatus 100 receives an audio signal including a plurality of channels from an external server, and FIG. 5 is a sequence diagram showing a case where the audio device 200 receives an audio signal including a plurality of channels from an external device. Accordingly, the overlapped description with FIG. 4 will be omitted.

When the communication connection with the audio device is performed through the first interface 130, the display apparatus 100 may transmit the audio setup information of the display apparatus 100 to the audio device 200 in operation S510. The audio device 200 may receive an audio signal including a plurality of channels from an external device (e.g., a DVD player, a Blue-ray player, or the like) in operation S520. The audio device 200 may communicate with an external device through the third interface 250, and in one embodiment, the third interface 250 may be a HDMI TDMS interface.

In operation S530, the audio device 200 may obtain an audio signal including a height channel based on the audio setup information of the display apparatus 100 including the plurality of channels received from the external device. The audio device 200 may transmit an audio signal including the obtained height channel to the display apparatus 100 in operation S540. The display apparatus 100 may output an audio signal including a height channel in operation S550, and the audio device 200 may output an audio signal other than the audio signal including the height channel.

Figure 6:
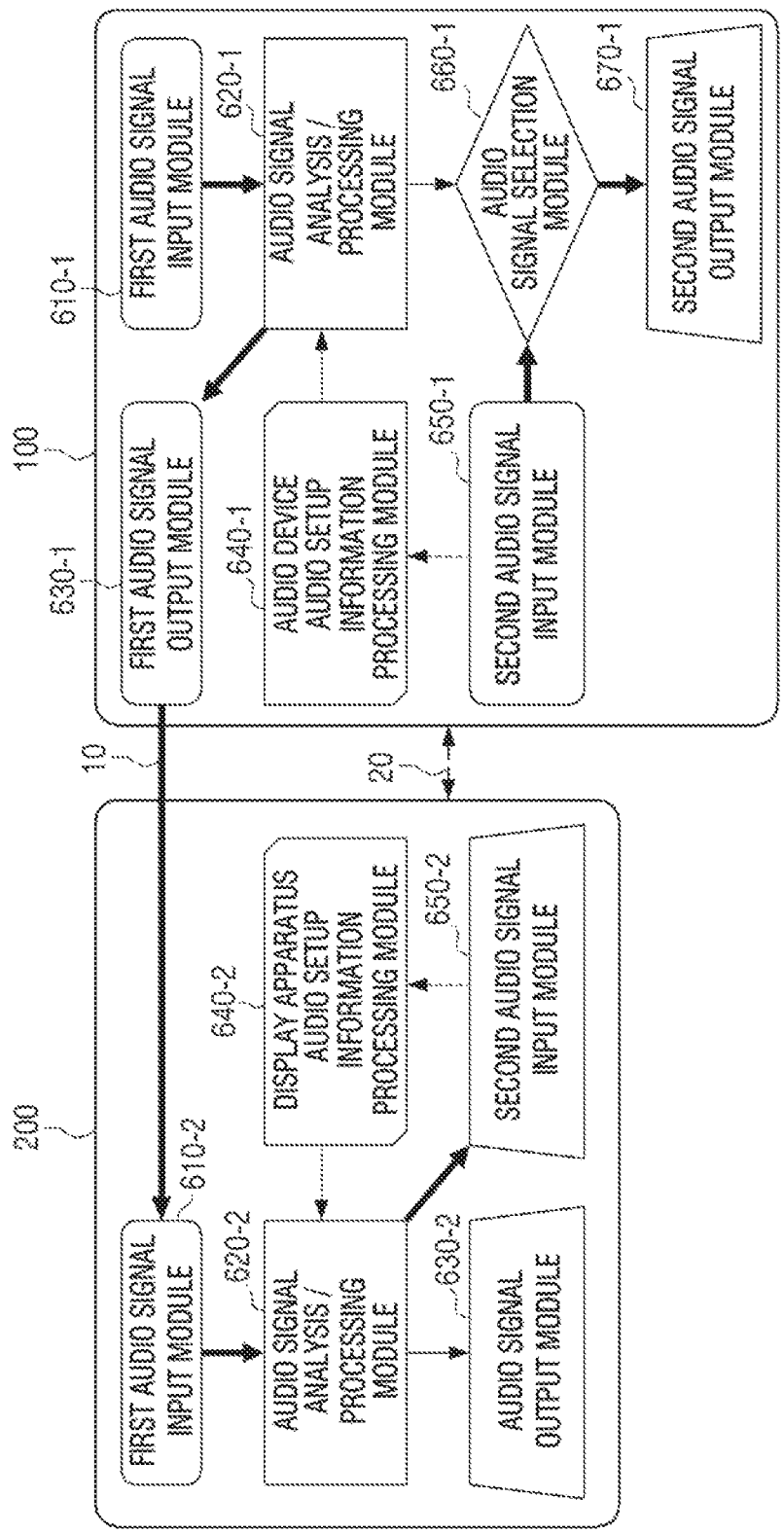
FIG. 6 is a diagram showing a software module of a display apparatus and an audio device according to an embodiment.

FIG. 6 is a diagram showing a software module of the display apparatus 100 and the audio device 200. The software module of the display apparatus 100 and the audio device 200 may be controlled by the processor 150 of the display apparatus 100 and the processor 240 of the audio device 200, respectively.

A first audio signal input module 610-1 of the display apparatus 100 may receive an audio signal including a plurality of channels received through an external server or other interface, and transmit the received audio signal to an audio signal analysis/processing module 620-1 of the display apparatus 100.

The audio signal analysis/processing module 620-1 of the display apparatus 100 may convert an audio signal including a plurality of channels received from the first audio signal input module 610-1 of the display apparatus 100 into an audio format supportable by the audio device 200. The audio signal analysis/processing module 620-1 of the display apparatus 100 may process the audio signal based on the supportable audio format information of the audio device 200 received from the audio device audio setup information processing module 640-1 of the display apparatus 100 (Dolby™ format, DTS™ format).

The audio signal analysis/processing module 620-1 of the display apparatus 100 may transmit an audio signal including a plurality of channels to a first audio signal output module 630-1 of the display apparatus 100. However, when the audio selection is output by the user, if a method of not using the audio device 200 is selected, the audio signal analysis/processing module 620-1 of the display apparatus 100 may perform various processing works for decoding, amplification, noise filtering, down mix, or the like, for an audio signal including a plurality of channels, and then transmit the signal to an audio signal selection module 660-1.

A first audio signal output module 630-1 of the display apparatus 100 may transmit, through a one-way data path 10, an audio signal including a plurality of channels to the first audio signal input module 610-2 of the audio device (200) through the second interface 140.

The second audio signal input module 650-1 of the display apparatus 100 may transmit, through a two-way data path 20, the audio setup information of the display apparatus 100 through the first interface 130, and receive, through the two-way data path 20, the audio signal including the setup information and the height channel of the audio device 200. The second audio signal input module 650-1 of the display apparatus 100 may transmit an audio signal including the height channel to an audio signal selection module 660-1 of the display apparatus 100.

The audio signal selection module 660-1 of the display apparatus 100 may transmit the audio signal including the height channel received from the second audio signal input module 650-1 of the display apparatus 100 or the audio signal including the plurality of channels received from the audio signal analysis/processing module 620-1 of the display apparatus 100 to a second audio signal output module 670-1 of the display apparatus 100, and the second audio signal output module 670-1 of the display apparatus 100 may output the received audio signal.

The first audio signal input module 610-2 of the audio device 200 may receive an audio signal including a plurality of channels from an external device via a third interface as well as from the first audio signal output module 630-1 of the display apparatus 100. The first audio signal input module 610-2 of the audio device 200 may transmit the received audio signal to the audio signal analysis/processing module 620-2 of the audio device 200.

The audio signal analysis/processing module 620-2 of the audio device 200 may obtain an audio signal including a height channel among the received audio signals including the plurality of channels. The audio signal analysis/processing module 620-2 of the audio device 200 may determine an audio signal including a height component of an audio signal including a plurality of channels based on the audio setup information of the display apparatus 100, and filter the determined audio signal to obtain an audio signal including a height channel to be output from the speaker of the display apparatus 100. The audio setup information of the display apparatus 100 may be received from the display apparatus audio setup information processing module 640-2 of the audio device 200.

The audio signal/analysis processing module 620-2 of the audio device 200 may transmit the audio signal including the height channel to the second audio signal output module 650-2 of the audio device 200 and transmit the audio signal other than the audio signal including the height channel to the audio signal output module 630-2 of the audio device 200.

The second audio signal output module 650-2 of the audio device 200 may transmit, through the two-way data path 20, an audio signal including the height channel to the second audio signal input module 650-1 of the display apparatus 100 through the first interface. The audio signal output module 630-2 of the audio device 200 may output an audio signal other than an audio signal including the height channel.

Figure 7:
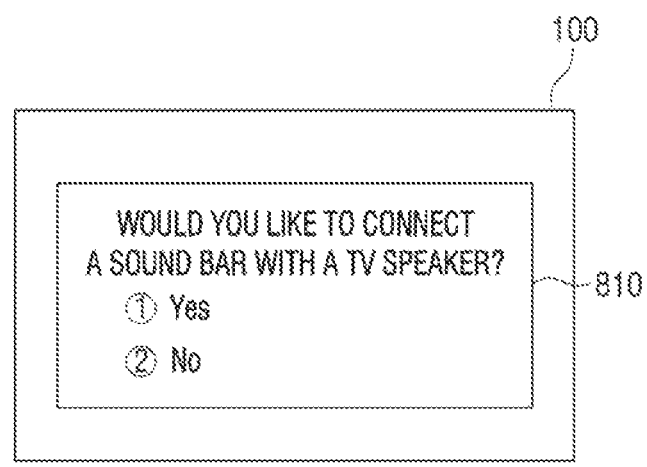
FIG. 7 is a diagram showing a user interface (UI) asking a method for outputting an audio signal including a plurality of channels according to an embodiment.

FIG. 7 is a diagram showing a user interface (UI) asking a method for outputting an audio signal including a plurality of channels according to an embodiment.

Based on a communication connection with the audio device 200 through the first interface, the display apparatus 100 may display a user interface (UI) 810 asking whether to output the audio signal including the plurality of channels received from the external server using the audio device 200, as shown in FIG. 7. The UI 810 shown in FIG. 7 is only one embodiment and may be implemented variously.

In an embodiment, when a user command to use the audio device 200 to output an audio signal is input through the UI 810, the display apparatus 100 may transmit an audio signal including a plurality of channels to the audio device 200. The audio device 200 may obtain an audio signal including a height channel among a plurality of channels based on the audio setup information of the display apparatus 100 and transmit the audio signal to the display apparatus 100. The display apparatus 100 may output an audio signal including a height channel received from the audio device 200, and the audio device 200 may output an audio signal other than an audio signal including the height channel.

In another embodiment, the display apparatus 100 may transmit an audio signal including a plurality of channels to the audio device 200 even though a user command not to use the audio device 200 to output the audio signal is input through the UI 810. The display apparatus 100 may output an audio signal after performing various processing jobs such as decoding, amplification, noise filtering, down mix, or the like, of the audio signal including a plurality of channels input from an external server or an external device.

When a user command to use an audio device is input through a UI 810, the display apparatus 100 may receive and output an audio signal including the height channel to the audio device 200, and the audio device 200 may output an audio signal excluding the height channel to the display apparatus 100.

Figure 8:
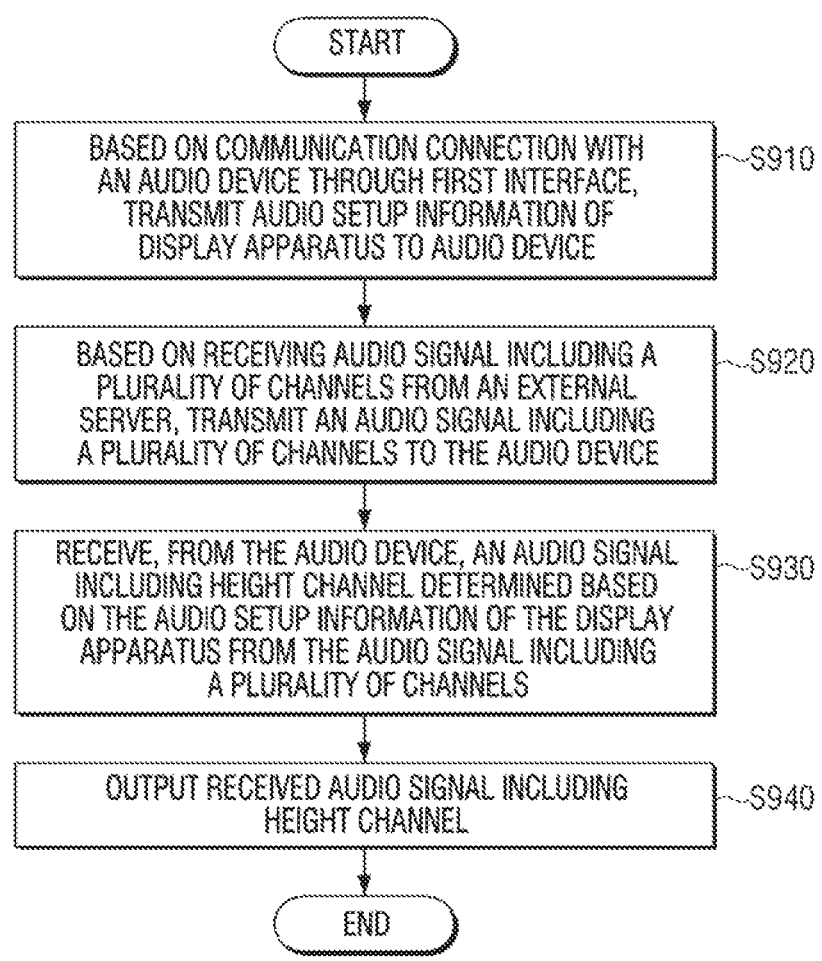
FIG. 8 is a flowchart of a method for controlling a display apparatus according to an embodiment.

FIG. 8 is a flowchart of a method for controlling the display apparatus 100 according to an embodiment.

Based a on communication connection with the audio device 200 through the first interface, the display apparatus 100 may transmit the audio setup information of the display apparatus 100 to the audio device 200 in operation S910. The display apparatus 100 may receive the audio setup information of the audio device 200 from the audio device 200.

In an embodiment, the display apparatus 100 may display a UI asking a method of outputting the audio signal. The subsequent operation may be a controlling method of the display apparatus 100 when a method of outputting an audio signal using the audio device 200 is selected by a user.

When an audio signal including a plurality of channels is received from an external server, the display apparatus 100 may transmit an audio signal including a plurality of channels to the audio device 200 in operation S920. The display apparatus 100 may transmit the received audio signal including a plurality of channels to the audio device 200 in the form that it is received, or may convert the signal into an audio format supportable by the audio device 200 and transmit the audio signal.

The display apparatus 100 may receive from the audio device 200 an audio signal including a height channel obtained based on the audio setup information of the display apparatus 100 in an audio signal including a plurality of channels in operation S930. The display apparatus 100 may output the received audio signal including the height channel in operation S940.

Figure 9:
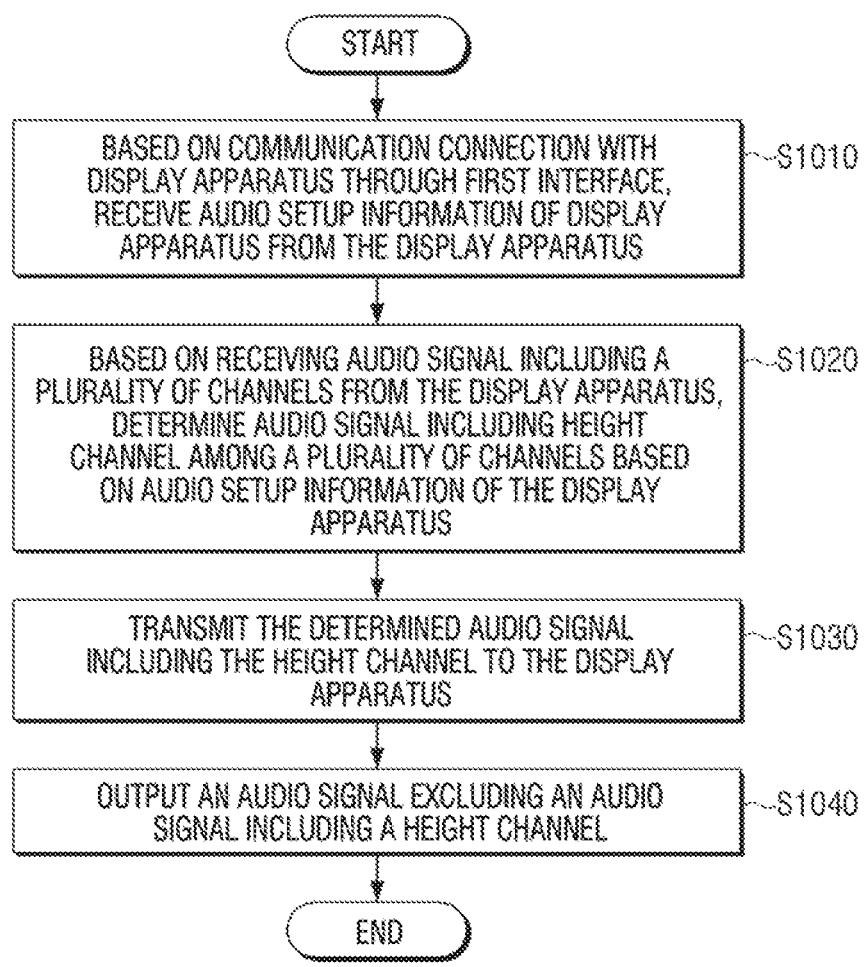
FIG. 9 is a flowchart of a method for controlling an audio device according to an embodiment.

FIG. 9 is a flowchart of a method for controlling the audio device 200 according to an embodiment.

Based on the communication connection with the display apparatus 100, the audio device 200 may receive audio setup information of the display apparatus 100 from the display apparatus 100 in operation S1010. The audio device 200 may transmit the audio setup information of the audio device 200 to the display apparatus 100 as well.

When an audio signal including a plurality of channels is received from the display apparatus 100, the audio device 200 may obtain an audio signal including a height channel among a plurality of channels based on the audio setup information of the display apparatus 100 in operation S1020. The audio device 200 may obtain an audio signal including a height channel to be output from the display apparatus 100 based on the audio setup information of the display apparatus 100 including the position information and the output information of the speaker included in the display apparatus 100.

The audio device 200 may transmit the obtained audio signal including the height channel to the display apparatus 100 in operation S1030 and output the audio signal excluding the audio signal including the height channel in operation S1040.

As described above, according to various embodiments, a display apparatus may output an audio signal including a height channel through duplex communication with an audio device to efficiently represent a three-dimensional effect of an audio signal, and may achieve a reduced circuit as a separate decoding processor for processing an audio signal of a multi-channel is not required.

The embodiments of the disclosure may be implemented as software that includes instructions stored in machine-readable storage media readable by a machine (e.g., a computer). A device may call instructions from a storage medium and that is operable in accordance with the called instructions, including an electronic apparatus (e.g., the display apparatus 100). When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium. For example, "non-transitory storage medium" may include a buffer in which data is temporarily stored.

According to embodiments, a method disclosed herein may be provided in software of a computer program product. A computer program product may be traded between a seller and a purchaser as a commodity. A computer program product may be distributed in the form of a machine readable storage medium (e.g., compact disc read only memory (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments, may be performed sequentially, in a parallel, repetitive, or heuristic manner, or at least some operations may be performed in a different order, omitted, or other operations can be added.

The foregoing example embodiments are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A display apparatus comprising:
a communication module comprising a circuit;
a first interface;
a second interface;
a memory configured to store at least one instruction; and
a processor connected to the communication module, the first interface, the second interface, and the memory, the processor being configured to control the display apparatus,
wherein the processor, by executing the at least one instruction, is configured to:
based on a communication connection with an audio device being established through the first interface, transmit, to the audio device, audio setup information of the display apparatus through the first interface;
based on receiving a first audio signal comprising a plurality of channels from an external server through the communication module, transmit a second audio signal comprising the plurality of channels to the audio device through the second interface;

receive, from the audio device, a third audio signal comprising a height channel obtained based on the audio setup information of the display apparatus from the second audio signal through the first interface; and output the received third audio signal.

2. The display apparatus of claim 1, wherein:
the first interface is a Serdes interface, and
the second interface is high definition multimedia interface enhanced audio return channel.

3. The display apparatus of claim 1, further comprising:
a plurality of speakers positioned in different positions along a height dimension of the display apparatus,
wherein the third audio signal is obtained based on position information and output information of the plurality of speakers provided in the audio setup information.

4. The display apparatus of claim 1, further comprising:
a display,
wherein the processor is further configured to, based on the communication connection with the audio device being established through the first interface, control the display to display a user interface (UI) inquiring how to output the first audio signal.

5. The display apparatus of claim 4, wherein the processor is further configured to, based on a method of outputting the first audio signal without using the audio device being selected through the UI, process and output the first audio signal based on the audio setup information of the display apparatus.

6. An audio device comprising:
a first interface;
a second interface;
a memory configured to store at least one instruction; and
a processor configured to execute the at least one instruction,
wherein the processor, by executing the at least one instruction, is further configured to:
based on a communication connection with a display apparatus being established through the first interface, receive, from the display apparatus, audio setup information of the display apparatus through the first interface;
based on receiving, from the display apparatus, a first audio signal comprising a plurality of channels through the second interface, obtain a second audio signal comprising a height channel based on the audio setup information of the display apparatus;
transmit, to the display apparatus, the second audio signal through the first interface; and
output a third audio signal excluding the second audio signal.

7. The audio device of claim 6, wherein the first interface is a Serdes interface, and the second interface is High Definition Multimedia Interface enhanced Audio Return Channel.

8. The audio device of claim 6, wherein the processor is further configured to:
determine the second audio signal comprising the height component based on position information and output information of a plurality of speakers of the display apparatus provided in the audio setup information, and
obtain the second audio signal by filtering the first audio signal comprising the determined height component.

9. The audio device of claim 6, wherein the processor is further configured to control a volume value of the second audio signal and a volume value of the third audio signal to be identical based on volume setup information of the display apparatus provided in the audio setup information.

10. The audio device of claim 6, further comprising:
a third interface;
wherein the processor is further configured to based on receiving, from an external device, the first audio signal comprising a plurality of channels through the third interface, obtain the second audio signal comprising the height channel from the first audio signal based on the audio setup information of the display apparatus.

11. A method for controlling a display apparatus, the method comprising:
based on a communication connection with an audio device being established through a first interface, transmitting, through the first interface, to the audio device, audio setup information of the display apparatus;
based on receiving a first audio signal comprising a plurality of channels from an external server, transmitting, through a second interface, a second audio signal comprising the plurality of channels to the audio device;
receiving, through the first interface, from the audio device, a third audio signal comprising a height channel obtained from the second audio signal based on the audio setup information of the display apparatus; and
outputting the received third audio signal.

12. The method of claim 11, wherein:
the first interface is a Serdes interface, and
the second interface of the display apparatus is high definition multimedia interface enhanced audio return channel.

13. The method of claim 11, wherein the third audio signal is obtained based on position information and output information of a plurality of speakers provided in the audio setup information.

14. The method of claim 11, wherein the transmitting audio setup information of the display apparatus further comprises:
based on the communication connection with the audio device being established through the first interface, displaying a user interface (UI) inquiring how to output the first audio signal.

15. The method of claim 14, further comprising:
based on a method of outputting the first audio signal without using the audio device being selected through the UI, processing and outputting the first audio signal based on the audio setup information of the display apparatus.

16. A method for controlling an audio device, the method comprising:
based on a communication connection with a display apparatus being established through a first interface, receiving, through the first interface, from the display apparatus, audio setup information of the display apparatus;
based on receiving, through a second interface, a first audio signal comprising a plurality of channels from the display apparatus, obtaining a second audio signal comprising a height channel based on the audio setup information of the display apparatus;
transmitting, through the first interface, the second audio signal to the display apparatus; and
outputting a third audio signal excluding the second audio signal.

17. The method of claim 16, wherein:
the first interface is a Serdes interface,
the second interface of the audio device is high definition multimedia interface enhanced audio return channel.

18. The method of claim 16, wherein the obtaining the second audio signal comprises:
determining the second audio signal comprising the height component based on position information and output information of a plurality of speakers of the display apparatus provided in the audio setup information; and
obtaining the second audio signal by filtering the first audio signal comprising the determined height component.

19. The method of claim 16, wherein the obtaining the second audio signal comprises controlling a volume value of the second audio signal and a volume value of the third audio signal to be identical based on volume setup information of the display apparatus provided in the audio setup information.

20. The method of claim 16, further comprising:
based on receiving, from an external device, the first audio signal through a third interface, obtain the second audio signal from the first audio signal based on audio setup information of the display apparatus.

\* \* \* \* \*